Dec. 19, 1939.   F. L. MAUTZ   2,183,995
KNIFE GRINDING MACHINE
Filed June 18, 1938   3 Sheets-Sheet 1
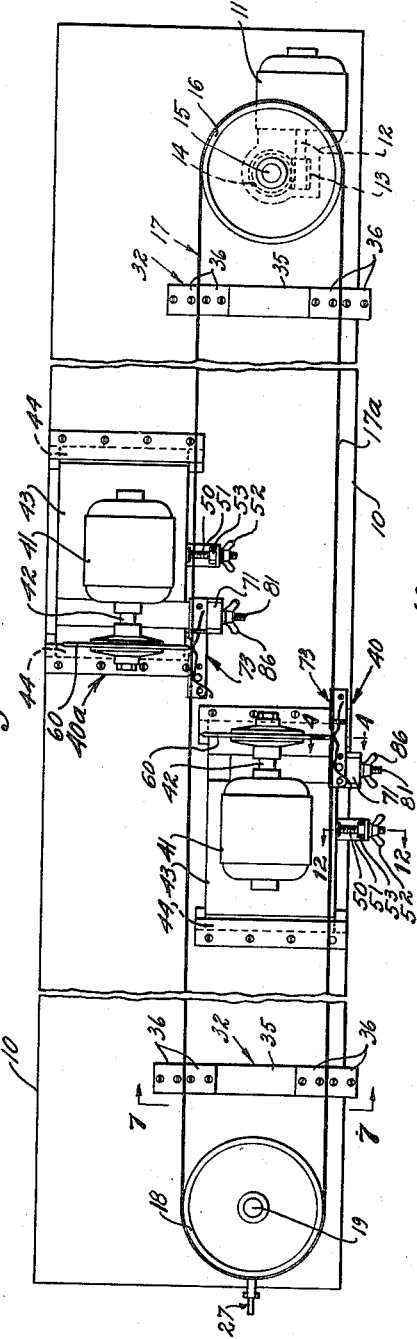
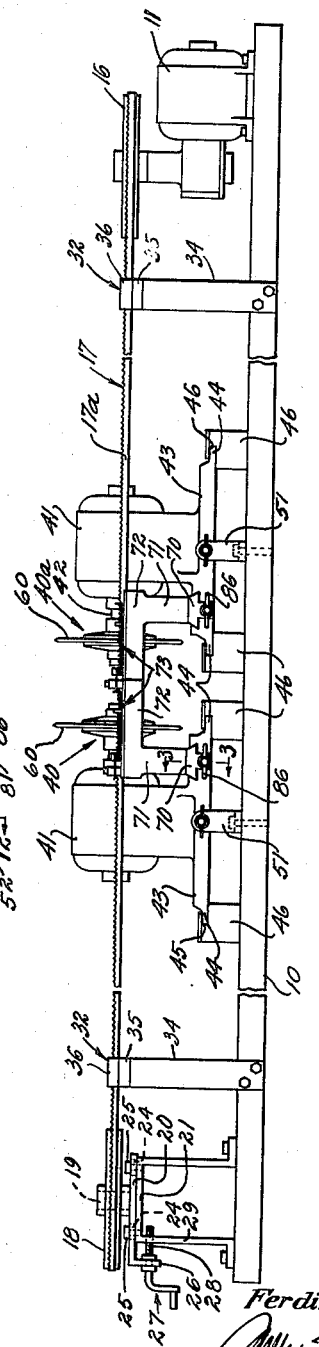
Inventor.
Ferdinand L. Mautz.
Attorney.

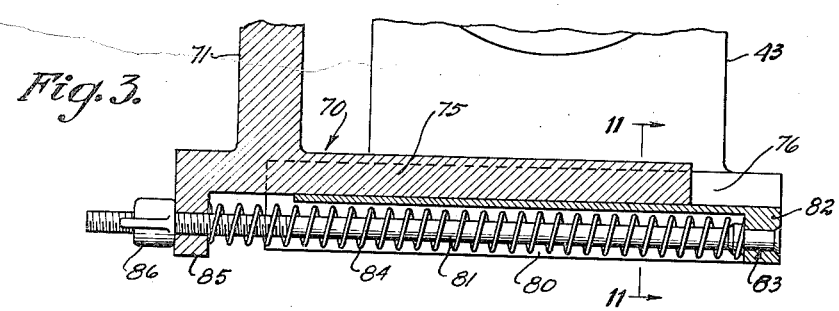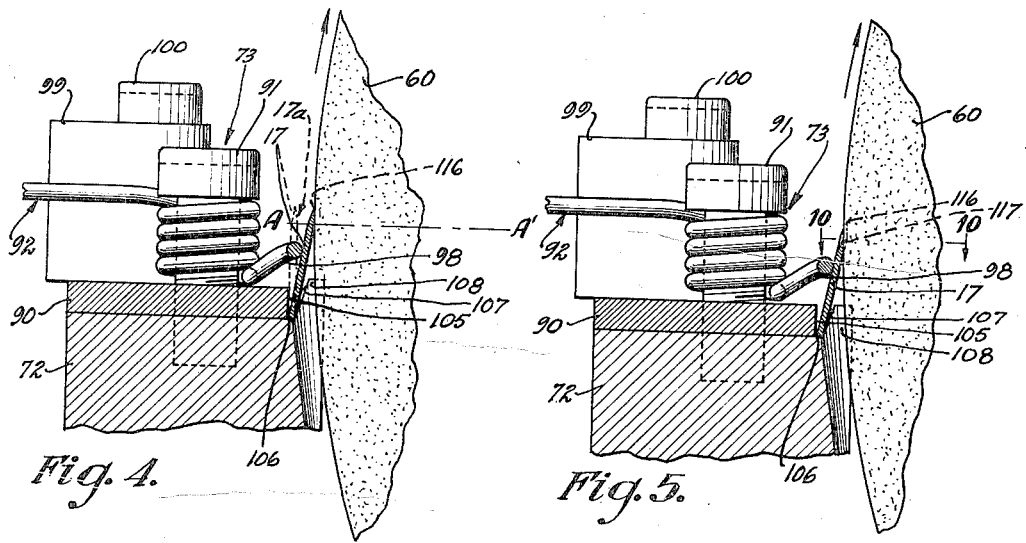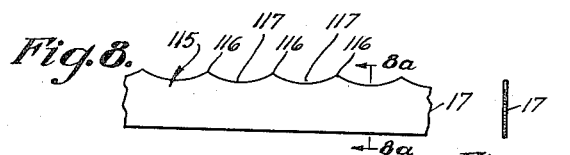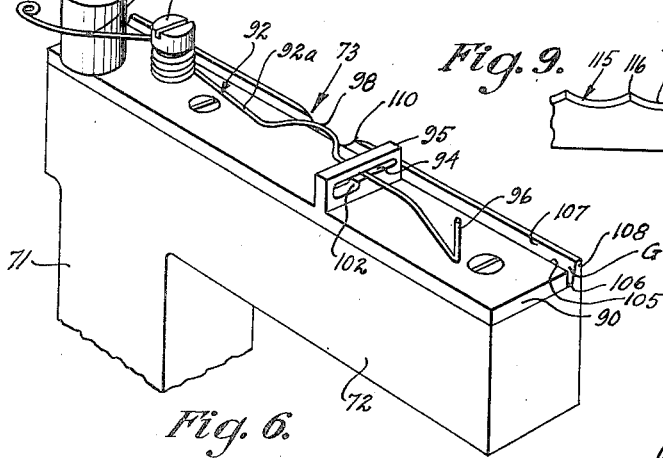

Dec. 19, 1939.  F. L. MAUTZ  2,183,995
KNIFE GRINDING MACHINE
Filed June 18, 1938   3 Sheets-Sheet 3

Inventor.
Ferdinand L. Mautz.

Attorney.

Patented Dec. 19, 1939

2,183,995

UNITED STATES PATENT OFFICE 2,183,995

KNIFE GRINDING MACHINE

Ferdinand L. Mautz, Inglewood, Calif., assignor to William Walter Hartman, Los Angeles, Calif.

Application June 18, 1938, Serial No. 214,478

17 Claims. (Cl. 51—74)

This invention relates generally to machines for grinding knife edges on blades of the flexible band type such as are typically employed in bread slicing machinery of the continuous band blade type. Such blades are ordinarily ground to a wave shaped or scalloped knife edge. The grinding of such edges has presented a difficult problem and complicated blade grinding machines have been devised to do this work on a fast and efficient basis.

It is the primary object of the present invention to provide a very simple machine for grinding endless band blades having scalloped, wave-shaped, or otherwise shaped cutting edges.

A further object of the invention is to provide a blade grinding machine adapted to grind a uniform and accurately formed wave-shaped or scalloped edge on such a blade, and to accomplish this in a minimum of time and with a minimum of difficulty.

The invention will be best understood without further preliminary discussion by referring at once to the following detailed description of a present preferred embodiment thereof, reference for this purpose being had to the accompanying drawings, in which:

Fig. 1 is a plan view of a blade grinding machine in accordance with the present invention;

Fig. 2 is a side elevation of the machine of Fig. 1;

Fig. 3 is a detail section taken on line 3—3 of Fig. 2;

Fig. 4 is a detail section taken on line 4—4 of Fig. 1 illustrating the grinding of the blade;

Fig. 5 is a view similar to Fig. 4 but showing another position in the grinding of the blade;

Fig. 6 is a perspective view of a blade guide block and resilient backing-up or deflecting means for the blade;

Fig. 8 is a view of a portion of a typical blade of the scalloped type after it has been punched to form the outline of the blade edge but before grinding;

Fig. 8a is a cross section on line 8a—8a of Fig. 8;

Fig. 9 shows a portion of the blade after grinding;

Figure 7:
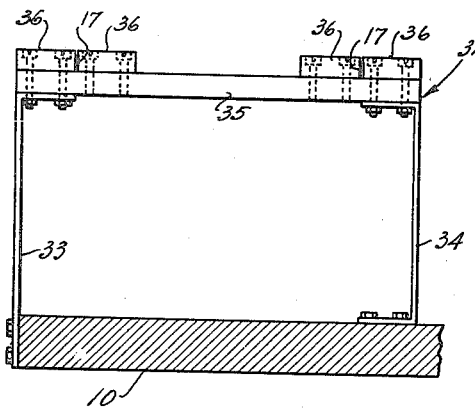
Fig. 7 is a section on line 7—7 of Fig. 1.

In the drawings, showing one typical and illustrative embodiment of the invention, numeral 10 designates any suitable machine base. Mounted on one end of base 10 is an electric drive motor 11, the horizontal shaft 12 of which drives a worm 13 meshing with a worm wheel 14 on the lower end of a vertical drive shaft 15. Mounted on the upper end of shaft 15 is a wheel or pulley 16 around which the endless band blade 17 is looped. Blade 17 will be understood to be typically an endless flexible band blade such as are used on band blade bread slicing machines, its original two ends having been either butt or lap welded, preferably in such manner that the thickness of the blade is unchanged at the splice.

At the other end of base 10 blade 17 is looped around a similar wheel or pulley 18 journalled on a vertical axis. Preferably, this pulley 18 is mounted for adjustment movement toward and from pulley 16, in order that the blade may be suitably tautened, though of course any other well known or suitable manner of tautening the blade may be substituted if desired. As here illustratively shown, however, pulley 18 is journalled on a vertical shaft 19 formed integrally with and extending upwardly from a plate 20 slidably mounted on a table 21 supported on base 10 as indicated in Fig. 2. Plate 20 is provided with slots 24, elongated in a direction proper for movement of the plate to tense the blade running on pulleys 16 and 18, and studs 25 extending downwardly through said slots and set into table 21 guide the plate for movement to adjust the tension of the blade. Plate 20 has a depending flange 26, in which is journalled a crank member 27 having a screw-threaded shank 28 screw-threaded in the side wall 29 of table 21. It will be evident that operation of this crank member slides plate 20 along table 21 to tighten or loosen the band blade.

Preferably, means are provided between pulleys 16 and 18 for laterally and vertically guiding and supporting the two courses of the band blade running between said pulleys. As typical of suitable means for this purpose, I illustrate a supporting and guiding means 32 adjacent each of said pulleys, and comprising in each instance a pair of legs or standards 33 and 34 mounted on and extending vertically from base 10, a cross bar 35 mounted on the upper ends of standards 33 and 34, the latter extending transversely of the two courses of the blade and its upper surface engaging the lower edges of the blade courses, so as to support the latter in proper vertical position with relation to the associated pulley and also with relation to the blade grinding means described later. Mounted on cross bar 35 are pairs of blocks 36, each pair defining a guideway for one of the blade courses, as clearly illustrated in the drawings. The two blocks defining each such guideway are of course so spaced as to provide a free sliding fit for the blade, so as to support the blade laterally but to avoid any substantial resistance to free movement of the blade. For the purpose of reducing wear, blocks 36 as well as bar 35 are preferably made of some suitable wear-resisting composition such as Micarta. The two guide assemblies 32 are located sufficiently far apart to permit the blade course therebetween to be deflected or twisted in a manner later to be described. It is here to be pointed out that while the use of the described guide assemblies 32 is preferred, these might be omitted, in which case the end pulleys would serve as the guide means for the blade courses. For the purpose of the broader claims, therefore, either guide assemblies 32 or pulleys 16 and 18 may be taken as the blade guide means.

Mounted substantially mid-way between guide assemblies 32 are two blade grinding mechanisms 40 and 40a, which are positioned and adapted to grind opposite sides of the blade, one operating on one course of the blade while the second operates on the other course of the blade. Blade grinding mechanisms 40 and 40a are substantial duplicates of one another, differing only, in the present illustrative embodiment, in that one is a right for left reversal of the other. Since the two grinding mechanisms are designed to grind opposite sides of the blade, one of the mechanisms, here 40, is mounted with its grinding element inside the endless blade, and the other, here 40a, is mounted with its grinding element outside the endless blade, as indicated for instance in Fig. 1.

The two grinding mechanisms 40 and 40a being substantially alike, a detailed description of one will suffice for both. I proceed therefore to a detailed description of a preferred form of grinding mechanism 40 for grinding the inside surface of the blade. Members of mechanism 40a corresponding to specifically described members of mechanism 40 will be identified by the same reference numerals but with the sub-letter a adjoined.

Grinding mechanism 40, in its present illustrative form, includes an electric motor 41, arranged with its drive shaft 42 horizontal and, preferably, substantially parallel to the two courses of the blade running between guide devices 32. This motor 41 is mounted on a horizontal base 43, having edge portions 44 slidably received in ways 45 provided in supporting members 46 secured to base 10. By any such provisions as described, electric motor 41 is mounted for horizontal adjustment movement transversely of blade course 17a.

Any suitable means may be provided for moving motor base 43 in slideway 45; as typical of any such means, I here show a threaded stud 50 screwthreaded into the forward side of base 43 and a perforated bracket 51 mounted on base 10 and positioned to loosely receive threaded stud 50, in the manner clearly illustrated in Figs. 1 and 2. A wing nut 52 on the outer end of stud 50 and a lock nut 53 threaded on said stud inside bracket 50 enable the motor base and members carried thereby to be adjusted transversely of the blade and then securely locked in adjusted position.

Figure 10:
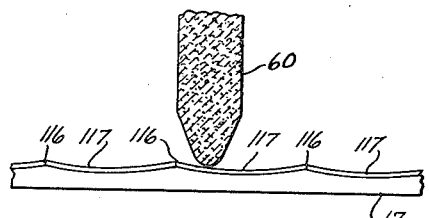
Fig. 10 is a section on line 10—10 of Fig. 5.
Figure 11:
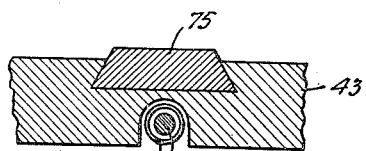
Fig. 11 is a detail section on line 11—11 of Fig. 3.
Figure 12:
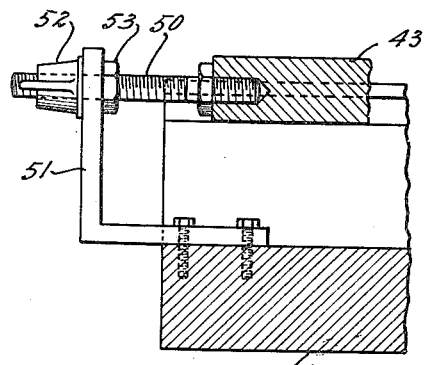
Fig. 12 is a detail section on line 12—12 of Fig. 1.

Motor shaft 42 carries a grinding wheel 60, which may be of a usual type, such as emery stone. This wheel is dressed to present a relatively narrow, rounded periphery 60a; typically of approximately one-eighth of an inch in radius (see Fig. 10).

The center of grinding wheel 60 is located substantially at the level of, or very slightly below, the upper edge of the band blade, for instance as indicated in Fig. 4, where the dot-dash line A—A' will be understood to be a center line passing through the axis of the grinding wheel. The motor and grinding wheel are adjusted to such a position on the machine base that the periphery of grinding wheel 60 is located adjacent but spaced a short distance from the normal position of blade course 17a. Means are provided for twisting the blade course so as to bring its upper edge over into contact with the periphery of the grinding wheel, and for this purpose I provide a guide member for engaging and holding the lower edge of the blade against movement in a direction toward the grinding wheel, and a yielding or resilient blade engaging means for engaging the blade and deflecting it, about said guide member as a sort of fulcrum, over toward the grinding wheel, so that its upper edge bears on the periphery of the grinding wheel. The action will be understood better by consideration of a present preferred means designed for accomplishment of the purpose intended. Accordingly, I proceed now to a detailed description of a simple embodiment of such means.

Slidably mounted transversely on base 43, for movement transversely of blade course 17a, is a carriage 70 having a vertical post 71 disposed outside said course 17a and having at its upper end an elongated portion 72, extending longitudinally of the blade, which serves as a base for the yielding or resilient blade engaging means, generally designated at 73.

Carriage 70 comprises a dove-tail portion 75 slidable in a complementary way 76 formed in the upper portion of motor base 43, between the motor and grinding wheel. Means are provided for adjusting the position of carriage 70 along way 76, and while any suitable means may be provided for this purpose, the following has been found simple and convenient. The motor base is apertured below way 76, as indicated at 80, to receive a long screwthreaded stud 81 which is set tightly, at its inner end, into base portion 82, as indicated at 83. A coil compression spring 84 encircling stud 81 engages a depending lug 85 on carriage 70, with which stud 81 has screwthreaded engagement. A wing nut 86 on the outer end of stud 81 is engaged by lug 85 under the pressure of spring 84. Thus carriage 70, and therefore the blade engaging mechanism 73 carried thereby, may be adjusted transversely of the motor base by simply turning wing nut 86, spring 84 acting at all times to hold the carriage in engagement with said nut.

Blade engaging means 73 includes a flat plate 90 mounted in a horizontal position on base member 72 (see Fig. 6). Mounted on this plate 90 is a screw or stud 91, around which is coiled a resilient spring member generally designated by numeral 92. One leg 92a of this spring member extends from stud 91 in a direction approximately parallel to the blade, its forward portion extending through a horizontal slot 94 in a flange 95 projecting upwardly from plate 90. Between plate 95 and stud 91 the spring member is provided with an outwardly bent portion 98 adapted to engage the side of the blade, for example as indicated in Figs. 4 and 5. As will be noted in such figures, the point of engagement between spring portion 98 and blade 17 is well up on the blade, preferably on the upper half of the blade. The other leg 92b of spring member 92 engages an anchor member 99 which is here in a form of an eccentric mounted on a stud 100 set or screwed into plate 90. The shape of the spring is such that with leg 92b in engagement with eccentric 99, the outwardly bent portion 98 of leg 92a is yieldingly pressed against the side of the adjacent blade. It will be evident that the pressure of the spring member against the blade is adjustable by rotation of eccentric 99 about stud 100. This is an adjustment of importance, as it is quite necessary that just the proper spring pressure be applied against the blade, as will become evident hereinafter. When it is desired to remove the spring member from engagement with the blade, leg 92a is grasped, as by means of its upturned extremity 96, and moved rearwardly in slot 94 and engaged back of shoulder 102, as will be readily understood from an inspection of Fig. 6.

Block or head 72 in combination with plate 90 are formed to provide a guide for the lower edge of the blade. Thus, as best shows in Figs. 4, 5 and 6, a guide groove or way G for the blade is defined by the vertical, longitudinally extending edge 105 of plate 90, a horizontal surface 106 formed on member 72 and projecting beyond surface 105, and an inclined surface 107 extending upwardly and outwardly from surface 106, the latter being formed on a flange portion 108 extending upwardly from member 72 above surface 106. The width of surface 106 between blade edge 105 and inclined surface 107 is just slightly greater than the thickness of the blade, so as to assure free running of the blade in the guideway, and so as to permit the blade to be tilted from its normal vertical position to the inclined operative positions of Figs. 4 and 5 while still moving freely in the guide slot. Flange 108 is interrupted at the location of the outward bend 98 in spring 92, as indicated at 110, so as to provide clearance for the grinding wheel which engages the blade directly opposite the outwardly bent portion of the spring member.

To adjust the machine for operation, motor carrying base 43 is first adjusted along its transverse ways 45 until the periphery of the grinding wheel occupies a position spaced a short distance from the normal or undeflected position of course 17a of the blade, indicated in dotted lines in Fig. 4. This spacing distance will vary with the cutting angle which it is desired to grind on the blade, the smaller the spacing distance between the normal position of the blade course and the periphery of the grinding wheel, the more acute will be the angle of the final cutting edge. Carriage 70 on which the blade engaging spring member is mounted is adjusted relatively to base 43, so that blade guideway G will not deflect the blade, but will be accommodated to its normal position as indicated by the dotted lines in Fig. 4. Thus, with spring member 92a hooked in its retracted, inoperative position, base 43 and carriage 70 are adjusted until the members are in the relative positions as indicated in Fig. 4. Spring member 92a is then released and allowed to bear on the side surface of the blade, deflecting the latter to a tilted or angular position and pressing its upper edge into engagement with the periphery of the grinding wheel. The lower edge of the blade, being confined by guide groove G, is maintained in its position, as indicated in Figs. 4 and 5, the middle portion of the blade between guides 32 thus swinging or tilting over into engagement with the periphery of the grinding wheel while its lower edge remains seated and confined within said guide groove.

Fig. 8 shows a typical unground blade after one of its edges has been cut with a scalloped formation 115, the blade being still of uniform thickness as indicated in Fig. 8a. The unground blade as illustrated in Fig. 8 may be produced from a uniform-width, steel band by a punching operation, as is well understood. It is to be noted at this time that while I show a scalloped edge formation 115, consisting of regularly spaced points 116 connected by arcuate portions 117, and while the machine is especially adapted to the grinding of such a blade, it is nevertheless not restricted to use with that particular edge formation, as blades having a wave shaped or sinuous edge may be equally well ground, as may blades of various other types.

Thus the blade, in the unground condition as shown in Fig. 8, is placed on the machine, and the machine adjusted as previously described, the scalloped or wave shaped edge of the blade being directed upwardly. Motor 11 is then set into operation, rotating pulley 16 and driving the blade. The grinding wheel motor 41 is then also set into operation, driving grinding wheel 60 in the direction indicated by the arrows in Figs. 4 and 5. Spring member 92 is then released from shoulder 102 and permitted to engage the travelling blade, deflecting the latter and pressing its upper, scalloped-cut edge into engagement with the periphery of the rotating grinding wheel.

Fig. 4 shows the blade as one of its points 116 passes the blade. As the blade travels on from the position of Fig. 4, it is flexed outwardly still further, in such manner as to maintain contact between the blade edge and the wheel. Fig. 5 shows the blade flexed to its maximum, the wheel at this time grinding the bottom of the arcuate portion 117. Thus the longitudinally travelling blade is so acted on by spring 92a as to flex back and forth as its scalloped or otherwise shaped upper edge passes the grinding wheel, its upper edge being pressed always against the grinding wheel in proper relation for grinding of the desired bevel. It will be obvious that for most efficient grinding the pressure exerted by spring member 92a must be under proper adjustment, and this spring pressure is therefore carefully regulated, in the manner previously described. It will also be evident that the angle at which the cutting edge is ground will depend upon the distance between the normal position of the blade course, determined by the position of guide groove G with reference to the periphery of the wheel. As previously mentioned, this relationship is regulated by adjustment of carriage 70 on base 43.

Grinding unit 40, placed between the blade courses and positioned to operate on blade course 17a, grinds the inside bevel of the blade. The other grinding unit 40a, placed outside the blade courses, so as to operate on blade course 17b, in the disposition clearly illustrated in Figs. 1 and 2, grinds the outside bevel of the blade. Thus both bevels of the blade are simultaneously ground. As typical of the invention, but without implication of limiting the same, it may be stated that a suitable blade speed is in the neighborhood of 60 feet per minute. The outline of the final sharpened edge is a comparatively accurate replica of the outline of the band as originally punched. The machine will grind a blade of any ordinary cutting edge outline so long as the radius of curvature of the periphery of the grinding wheel is small compared to the number of scallops or waves per unit length of the blade.

I claim:

1. In a machine for grinding the cutting edge of a flexible band blade, the combination of means for tensing and for longitudinally driving said blade, a rotatable grinding wheel turning adjacent but normally out of contact with the side of the blade, said grinding wheel having a curved peripheral portion presented toward the side of said blade, a guide for the rearward edge of the blade at a point near said grinding wheel, and yielding means for engaging the side of said blade opposite said grinding wheel and deflecting said blade laterally to press its cutting edge into engagement with the periphery of said grinding wheel.

2. In a machine for grinding the cutting edge of a flexible band blade, the combination of guide means engaging said blade at points spaced longitudinally of the blade, means for tensing said blade between said guide means and for longitudinally driving said blade, a rotatable grinding wheel turning adjacent but normally out of contact with the side of the blade between said guide means, said grinding wheel having a curved peripheral portion presented toward the side of said blade, a blade guide having a guideway receiving and confining the rearward edge of the blade at a point near the grinding wheel, and resilient means for engaging the side of said blade opposite said grinding wheel and deflecting said blade laterally to press its cutting edge into engagement with the periphery of said grinding wheel.

3. In a machine for grinding the cutting edge of a flexible band blade, the combination of guide means engaging said blade at points spaced longitudinally of the blade, means for tensing said blade between said guide means and for longitudinally driving said blade, a rotatable grinding wheel turning adjacent but normally out of contact with the side of the blade between said guide means, said grinding wheel having a curved peripheral portion presented toward the side of said blade, and yielding means for twisting the blade course between said guide means so that its cutting edge is deflected laterally and yieldingly pressed into engagement with the periphery of said grinding wheel.

4. In a machine for grinding the cutting edge of a flexible band blade, the combination of guide means engaging said blade at points spaced longitudinally of the blade, means for tensing said blade between said guide means and for longitudinally driving said blade, a rotatable grinding wheel turning adjacent but normally out of contact with the side of the blade between said guide means, said grinding wheel having a curved peripheral portion presented toward the side of said blade, a guide for the rearward edge portion of the blade positioned approximately opposite said grinding wheel and affording a fulcrum for the rearward edge of the blade about which the blade may be tilted over toward the grinding wheel, and yielding means for engaging the side of said blade opposite said grinding wheel and tilting it about said fulcrum to a position with its cutting edge contacting said grinding wheel.

5. In a machine for grinding the cutting edge of an endless flexible band blade, the combination of a frame, pulleys journalled on said frame about which said endless blade may be trained, means for driving one of said pulleys, guide means engaging the blade at spaced points between two pulleys and defining a straight blade course, a rotatable grinding wheel having a curved peripheral portion presented toward the side of said blade at a point substantially midway of said blade course, means affording a fulcrum for the rearward edge of said blade between said guide means about which the blade may be tilted toward the grinding wheel, and yielding means for engaging the side of said blade opposite said grinding wheel and tilting it about said fulcrum to a position with its cutting edge contacting said grinding wheel.

6. In a machine for grinding the cutting edge of an endless flexible band blade, the combination of a frame, pulleys journalled on said frame about which said endless blade may be trained, means for driving one of said pulleys, a rotatable grinding wheel having a curved peripheral portion presented toward the side of said blade at a point substantially midway of said blade course, means affording a fulcrum for the rearward edge of said blade between said guide means about which the blade may be tilted toward the grinding wheel, and yielding means for engaging the side of said blade opposite said grinding wheel and tilting it about said fulcrum to a position with its cutting edge contacting said grinding wheel.

7. In a machine for grinding the cutting edge of an endless flexible band blade, the combination of a frame, pulleys journalled on said frame about which said endless blade may be trained, an adjustable mounting for one of said pulleys whereby the blade may be tensioned on the pulleys, means for driving one of said pulleys, guide means engaging the blade at spaced points between two pulleys and defining a straight blade course, a rotatable grinding wheel having a curved peripheral portion presented toward the side of said blade at a point substantially midway of said blade course, means affording a fulcrum for the rearward edge of said blade between said guide means about which the blade may be tilted toward the grinding wheel, and yielding means for engaging the side of said blade opposite said grinding wheel and tilting it about said fulcrum to a position with its cutting edge contacting said grinding wheel.

8. In a machine for grinding the cutting edge of an endless flexible band blade, the combination of a frame, pulleys journalled on said frame about which said endless blade may be trained, means for driving one of said pulleys, guide means engaging the blade at spaced points between two pulleys and defining a straight blade course, a motor having a base mounted for adjustment movement in a direction transversely of said blade course, a grinding wheel on the shaft of said motor having a curved peripheral portion presented toward the side of said blade at a point substantially midway of said blade course, means affording a fulcrum for the rearward edge of said blade between said guide means about which the blade may be tilted toward the grinding wheel, yielding means for engaging the side of said blade opposite said grinding wheel and tilting it about said fulcrum to a position with its cutting edge contacting said grinding wheel, and a carrier for said fulcrum and yielding blade engaging means adjustably movable with relation to said frame in a direction transversely of said blade course.

9. In a machine for grinding a wave shaped or scalloped cutting edge or the like on a flexible band blade, the combination of spaced guide means for said band blade defining a straight blade course, means for tensioning and for longitudinally driving said blade, a rotatable grinding wheel having a rounded peripheral portion presented to and spaced a short distance from the side of said blade course and travelling transversely of said blade course, and means for yieldingly engaging said blade on its side opposite said grinding wheel and at a point near its cutting edge in a manner to deflect laterally the cutting edge of the blade relatively to the rearward edge of the blade in a direction toward the grinding wheel so that the cutting edge of the blade is pressed into engagement with said peripheral portion of the grinding wheel.

10. In a machine for grinding a wave shaped or scalloped cutting edge or the like on a flexible band blade, the combination of spaced guide means for said band blade defining a straight blade course, means for tensioning and for longitudinally driving said blade, a grinding wheel having a rounded peripheral portion presented to and spaced a short distance from the side of said blade course and travelling transversely of said blade course, a blade guide for the rearward edge of said blade at a point approximately opposite said grinding wheel confining said rearward blade edge against substantial deflection toward said grinding wheel, and resilient means for yieldingly engaging said blade on its side opposite said grinding wheel and deflecting and twisting said blade so that its cutting edge is pressed into engagement with said peripheral portion of the grinding wheel.

11. In a machine for grinding a wave shaped or scalloped cutting edge or the like on a flexible band blade, the combination of spaced guide means for said band blade defining a straight blade course, means for tensioning and for longitudinally driving said blade, a grinding wheel having a rounded peripheral portion presented to and spaced a short distance from the side of said blade course and travelling transversely of said blade course, a guide for the rearward edge of said blade between said guide means affording a support about which the blade may be tilted over toward the grinding wheel, and yielding means for engaging the blade on its side opposite the grinding wheel for tilting said blade about said support so that its cutting edge bears on the rounded peripheral portion of the grinding wheel.

12. In a machine for grinding a wave shaped or scalloped cutting edge or the like on a flexible band blade, the combination of spaced guide means for said band blade defining a straight blade course, means for tensioning and for longitudinally driving said blade, a grinding wheel having a rounded peripheral portion presented to and spaced a short distance from the side of said blade course and travelling transversely of said blade course, a guide for the rearward edge of said blade between said guide means affording a support about which the blade may be tilted over toward the grinding wheel, a spring member engageable with the blade on its side opposite the grinding wheel for tilting said blade about said support so that its cutting edge bears on the rounded peripheral portion of the grinding wheel, and means for regulating the pressure exerted by the spring member on the blade.

13. In a machine for grinding a wave shaped or scalloped cutting edge or the like on a flexible band blade, the combination of spaced guide means for said band blade defining a straight blade course, means for tensioning and for longitudinally driving said blade, a grinding wheel having a rounded peripheral portion presented to and spaced a short distance from the side of said blade course and travelling transversely of said blade course, a guide for the rearward edge of said blade between said guide means affording a support about which the blade may be tilted over toward the grinding wheel, a spring member for engaging the blade on its side opposite the grinding wheel for tilting said blade about said support so that its cutting edge bears on the rounded peripheral portion of the grinding wheel, and means for releasing the pressure of said spring member on the blade.

14. In a grinding machine for an endless flexible band blade, the combination of a base, pulleys rotatably supported on said frame about which said endless blade may be trained, means for driving one of said pulleys, grinding means for grinding a cutting edge bevel on one side of the blade embodying a rotatable grinding wheel mounted inside the endless band blade trained on said pulleys, and adjacent one of the courses of said blade between said pulleys, together with means for flexing and twisting said blade course to move its cutting edge against the periphery of said grinding wheel, and grinding means for grinding a cutting edge bevel on the opposite side of the blade embodying a rotatable grinding wheel mounted outside the endless band blade trained on said pulleys, and adjacent the other of the courses of said blade between said pulleys, together with means for flexing and twisting said blade course to move its cutting edge against the periphery of said grinding wheel.

15. In a machine for grinding the cutting edge of a flexible band blade, the combination of means for tensioning and longitudinally driving a length of the blade, a rotatable grinding wheel having a peripheral portion presented toward but slightly spaced from one side of the blade and travelling transversely of the length of the blade, and blade twisting means including a yielding element located substantially opposite said grinding wheel for twisting said blade and yieldingly pressing its cutting edge against the periphery of the grinding wheel.

16. In a machine for grinding the cutting edge of a flexible band blade, the combination of means for tensioning and longitudinally driving a length of the blade, a rotatable grinding wheel having a peripheral portion presented toward but slightly spaced from one side of the blade and travelling transversely of the length of the blade, and yielding blade deflecting means engaging the side of the blade opposite the grinding wheel for rotating a portion of the blade about an axis located rearwardly of its cutting edge and thereby laterally deflecting the cutting edge of the blade sufficiently to bear on the periphery of the grinding wheel.

17. In a machine for grinding the cutting edge of a flexible band blade, the combination of means for tensioning and longitudinally driving a length of the blade, a rotatable grinding wheel having a peripheral portion presented toward but slightly spaced from one side of the blade and travelling transversely of the length of the blade, a reaction member adapted to engage the blade near its rearward edge and on that side of the blade on which the grinding wheel is located, and yielding means adapted to engage the opposite side of the blade at a point nearer its cutting edge and to deflect said cutting edge about said reaction member as a fulcrum point sufficiently to engage the periphery of the grinding wheel.

FERDINAND L. MAUTZ.